(12) United States Patent
Szczudrawa

(10) Patent No.: US 11,548,414 B2
(45) Date of Patent: Jan. 10, 2023

(54) VEHICLE SEAT WITH EASY ENTRY ADJUSTMENT

(71) Applicant: Faurecia Autositze GmbH, Stadthagen (DE)

(72) Inventor: Dominik Szczudrawa, Warsaw (PL)

(73) Assignee: Faurecia Autositze GmbH, Stadthagen (DE)

( * ) Notice: Subject to any disclaimer, the term of this patent is extended or adjusted under 35 U.S.C. 154(b) by 0 days.

(21) Appl. No.: 17/307,356

(22) Filed: May 4, 2021

(65) Prior Publication Data

US 2021/0347283 A1 Nov. 11, 2021

(30) Foreign Application Priority Data

May 5, 2020 (DE) .................... 10 2020 112 096.6

(51) Int. Cl.
*B60N 2/12* (2006.01)
(52) U.S. Cl.
CPC .................... *B60N 2/123* (2013.01)
(58) Field of Classification Search
CPC ............ B60N 2/12; B60N 2/123; B60N 2/20
USPC ........................................................ 297/341
See application file for complete search history.

(56) References Cited

U.S. PATENT DOCUMENTS

| | | | | |
|---|---|---|---|---|
| 5,100,092 A | * | 3/1992 | Sovis | B60N 2/123 248/429 |
| 8,967,719 B2 | | 3/2015 | Ngiau | |
| 9,050,909 B2 | | 6/2015 | Röhnert | |
| 9,126,507 B2 | * | 9/2015 | Radermacher | B60N 2/14 |
| 2013/0200668 A1 | * | 8/2013 | Michalak | B60N 2/06 297/341 |
| 2015/0321583 A1 | * | 11/2015 | Sasaki | B60N 2/07 297/341 |
| 2017/0166094 A1 | | 6/2017 | Frye | |
| 2019/0225129 A1 | | 7/2019 | Kish | |

FOREIGN PATENT DOCUMENTS

| | | |
|---|---|---|
| DE | 102004015451 A1 | 10/2005 |
| DE | 202009002580 U1 | 7/2010 |
| DE | 102015009357 A1 | 1/2017 |
| DE | 102017101075 A1 | 7/2018 |
| DE | 102019101551 A1 | 7/2019 |
| EP | 2571718 B1 | 7/2017 |
| WO | 2011143758 A1 | 11/2011 |

* cited by examiner

*Primary Examiner* — Sarah B McPartlin
(74) *Attorney, Agent, or Firm* — Barnes & Thornburg LLP

(57) ABSTRACT

The present disclosure relates to a vehicle seat with a frame formed by a seating portion and a back rest, upper rails longitudinally adjustable on lower rails and lockable by means of a longitudinal rail locking mechanism, a coupling system for adjustment of the frame in relation to the upper rails, said coupling system comprising a coupling member with a coupling member pivot axis, a seat locking mechanism for locking the vehicle seat in an upright seating position, where said frame, upon operation of an easy entry actuator and unlocking of the seat locking mechanism, can be tilted forward starting from the upright seating position.

12 Claims, 11 Drawing Sheets

VEHICLE SEAT WITH EASY ENTRY ADJUSTMENT

PRIORITY CLAIM

This application claims priority to German Patent Application No. DE 10 2020 112 096.6, filed May 5, 2020, which is expressly incorporated by reference herein.

BACKGROUND

The present disclosure relates to a vehicle seat with easy entry adjustment provided, in particular, for a passenger car. The vehicle seat may be provided, in particular, in a rear or middle seat row.

SUMMARY

According to the present disclosure, a vehicle seat comprises a seating portion with a back rest that form a frame which can pivot on upper rails via a couple system, in particular, a four joint arrangement. The upper rails are longitudinally adjustable on lower rails to be mounted on the car chassis and can be locked via a longitudinal rail locking mechanism.

In the upright seat position the seating portion or, respectively, the frame formed by the seating portion and the back rest, is locked via a seat locking mechanism. The user can unlock the seat locking mechanism by actuating an easy entry handle so that the frame formed by the seating portion with the back rest can subsequently be tilted forward via the four joint arrangement into an easy entry position. This tilting motion usually unlocks the longitudinal rail locking mechanism so that the user can subsequently longitudinally displace the vehicle seat in the forward direction so as to allow access to e.g. a rear seat row.

For resetting the adjustment the user can grab the back rest and so push the vehicle seat or, respectively, the frame with four joint arrangement and upper rails in the backwards direction back into the longitudinal position and tilt the frame formed by the seating portion with the back rest back into the seating position in which the seat locking mechanism is locked.

Hereby, in general, when resetting the adjustment, the longitudinal position of the seating position is already predetermined by the starting position. However, the respective longitudinal position may possibly be obstructed e.g. by luggage behind the seat row so that this re-adjustment may be problematic.

The present disclosure is based on the object of creating a vehicle seat with easy entry adjustment allowing for a high flexibility in readjustment.

In illustrative embodiments, a readjustment from the easy entry position, which is tilted forward and pushed forward longitudinally, in different longitudinal positions is made possible. In particular, a readjustment may be provided in every backwards longitudinal position.

In illustrative embodiments, the user can adjust the vehicle seat upon readjustment to a suitable longitudinal position in which the vehicle seat is not obstructed by e.g. objects in the rear even during subsequent backwards tilting. Thus, the user can select this longitudinal position directly upon readjustment.

In particular, both the adjustment of the seating position to the easy entry position and the readjustment may be carried out using one hand only so that the operation is quick and easy.

In illustrative embodiments, the construction may be achieved using only a few additional elements. Thus, the high functionality may be achieved already by attaching a separate cam element to a coupling member of the easy entry four joint arrangement. The cam element serves to unlock the rail and may be provided, in particular, pivoting in a lower coupling member pivot axis of the coupling member, whereby the cam element upon forward tilting is taken along (tappeted) by the pivoting coupling member thereby enabling the longitudinal unlocking. Thus, an automatic longitudinal unlocking may happen upon forward tilting the frame. Thus, upon actuating the easy entry handle, e.g. an easy entry button provided on the back side of the back rest, the user can tilt the back rest with the seating portion on the easy entry four joint arrangement forward and thereby unlock the longitudinal seat lock. By virtue of the mechanical inertia of the forward tilting construction alone it is usually possible to initiate the longitudinal adjustment so as to enable a continuous fluent actuation to achieve the forward adjusted easy entry position.

In readjusting, the user is essentially free to choose a desired longitudinal position. Thus, he will pull the vehicle seat backwards, in particular by grabbing the back rest, and can operate the easy entry handle in the longitudinal position deemed suitable.

This, alone, results in the advantage that one and the same easy entry actuator is provided for both adjustments, i.e. in both directions, i.e. a simple operation without confusing the user. In that the user upon readjustment operates the easy entry handle in the desired longitudinal position, preferably, the cam element may be titled back for locking without pivoting the easy entry four joint arrangement. Thus, the longitudinal locking of the upper rails in relation to the lower rails can be released and thus lock in the current longitudinal position. In this locked longitudinal position the user may subsequently tilt the vehicle seat back to the upright seating position, whereby the seat locking mechanism again automatically locks in the back tilting motion.

Hereby, advantageously, a controller device, in particular an electronic controller device, is provided which detects the actuation signal upon operation of the easy entry handle and further reads out the locking state of the seat locking mechanism. Thus, the controller device can detect whether the operation of the easy entry handle either starting from the seating position serves for unlocking and adjusting to the easy entry position or for readjustment from the easy entry position to the seating position: When unlocking starting from the seating position the seat locking mechanism is still locked while in readjustment it is unlocked.

When operating the easy entry starting from the seating position the controller device may trigger, in particular, a first actuator for unlocking the seat locking mechanism; When operating the easy entry in readjustment, i.e. with the frame being tilted forward, the controller device may trigger, in particular, a second actuator which pivots the cam element thereby enabling locking of the rail. Thus, the high functionality according to the present disclosure can be attained by little additional expenditure, in particular, a cam element that can be carried along.

According to an embodiment deviating here from, a storage device may be provided which stores, starting from the seating position, the respective current longitudinal position. Thus, when the user subsequently readjusts the vehicle seat starting from the easy entry position, the pre-stored longitudinal position can be occupied again, e.g. by means of an automatic mechanical locking in this longitudinal position. Thus, a memory function of the longitudinal position is attained.

According to the present disclosure, the frame may be adjusted in one pieces or rigidly respectively in the forward tilting motion into the easy entry position; further, the back rest may be adjusted in relation to the seating portion in the forward tilting motion.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 4 is a side elevation view of the vehicle seat showing an unlocked seat locking mechanism and forward tilted vehicle seat in on the longitudinal rails;

FIG. 4B is a side elevation view of the vehicle suggesting readjustment to a backward longitudinal position different from the starting position;

FIG. 9 is an enlarged detail view of a portion of the vehicle seat in the locked seating position corresponding to FIG. 3;

FIG. 10 is an enlarged detail view of a portion of the vehicle seat in the forward tilted easy entry position without longitudinal adjustment, corresponding to FIG. 4;

FIG. 11 is an enlarged detail view of a portion of the vehicle seat in the complete easy entry position, following that of FIG. 10, in the forward longitudinal position, corresponding to FIG. 4A;

FIG. 12 is an enlarged detail view of a portion of the vehicle seat in the readjustment to the backward longitudinal position of FIG. 4B;

FIG. 13 is an enlarged detail view of a portion of the vehicle seat in subsequent operation of the cam element for rail locking;

FIG. 14 is an enlarged detail view of a portion of the vehicle seat showing the subsequent readjustment to the upright seating position (final position in seating position); and FIG. 15 is an enlarged detail view of a portion of the vehicle seat suggesting readjustment of the cam element to the starting position.

DETAILED DESCRIPTION

Figure 1:
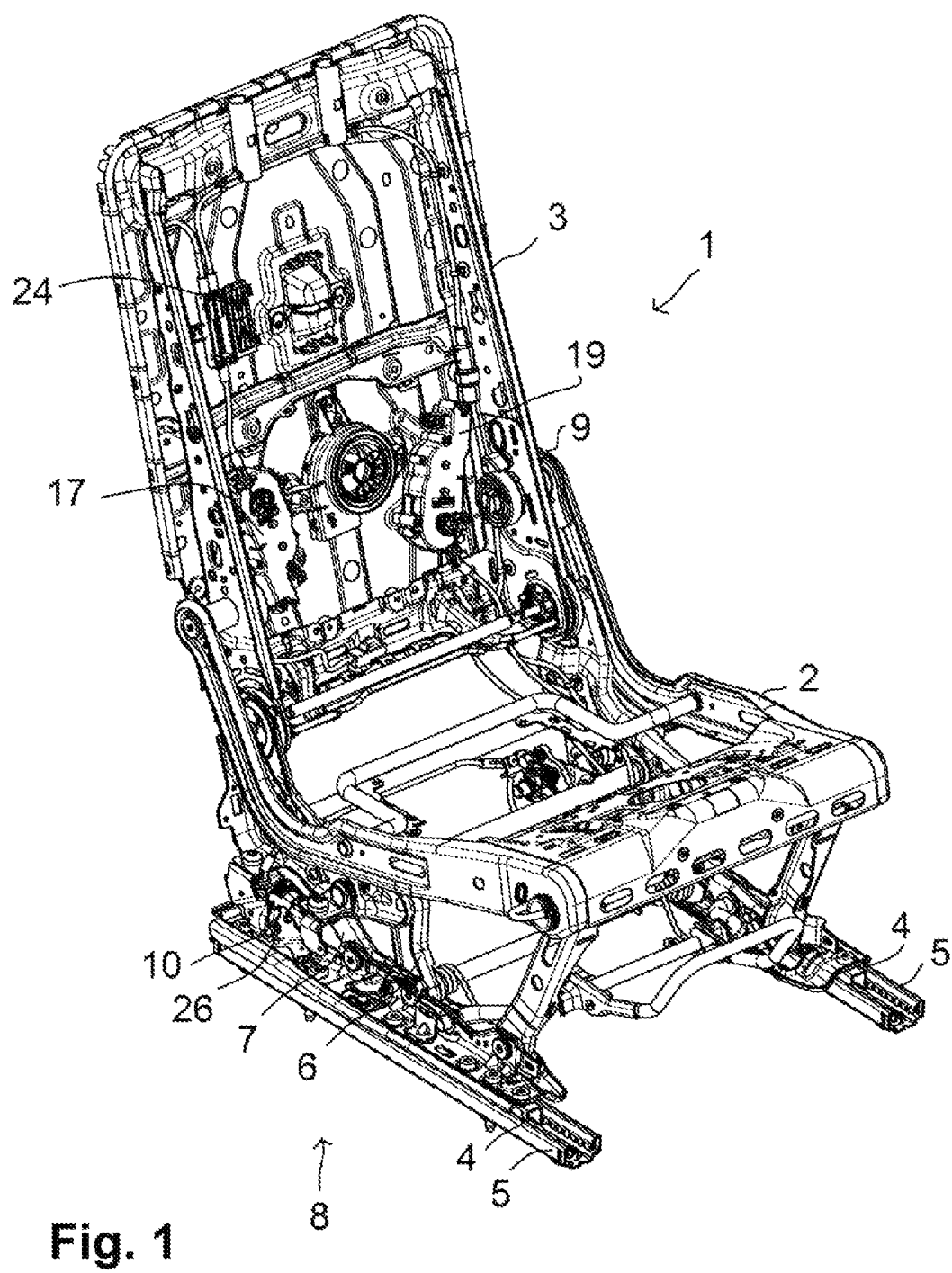
FIG. 1 is a vehicle seat according to an embodiment of the present disclosure in a perspective front view.

A vehicle seat 1 is provided to be mounted in a passenger car, in particular, in a rear or middle seat row, and comprises a seating portion 2, a back rest 3 and a rail system having two upper rails 4 which can be adjusted in the longitudinal direction in relation to the lower rails 5 to be mounted on the vehicle chassis. The seating portion 2 and the back rest 3 form a frame 9 which is adjustably attached to the upper rails 4 via an easy entry four joint coupling system 8 having two front coupling members 6 and two rear coupling members 7 (easy entry coupling members). The frame 9 can tilt in relation to the upper rails 4 between an upright seating position shown in FIGS. 1 through 3 and a forward tilted easy entry position shown in FIG. 4. In the upright seating position the frame 9 is locked by a seat locking mechanism 10; moreover, the upper rails 4 is locked onto the lower rails 5 each via a longitudinal rail locking mechanism 12.

Figure 7:
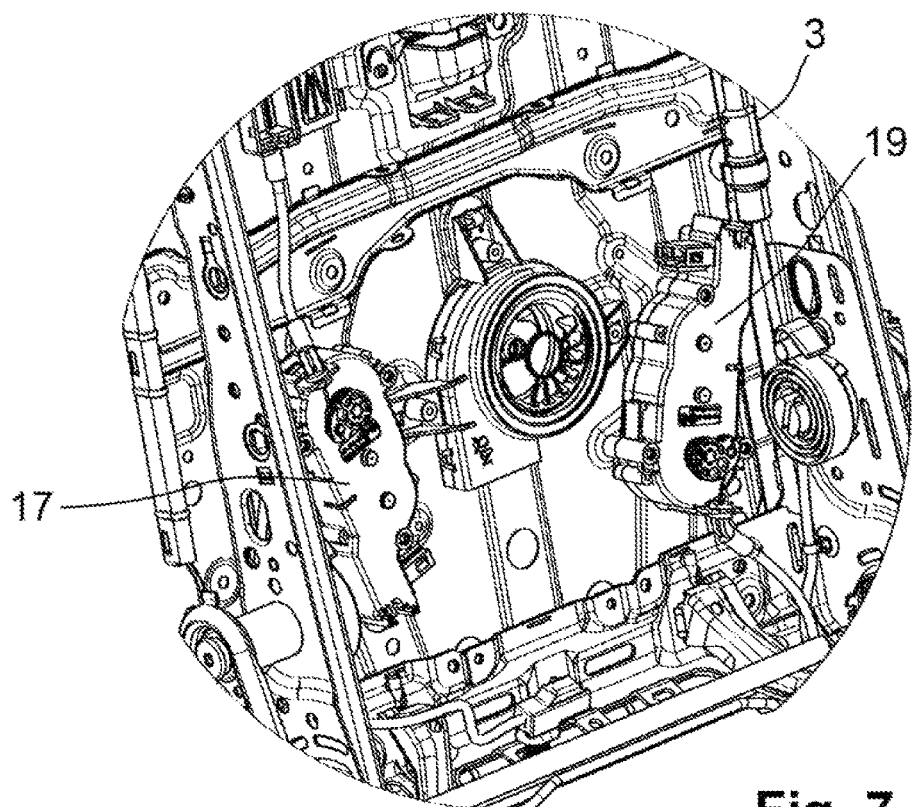
FIG. 7 is a perspective view of a portion of the vehicle seat showing the two electric actuators.

Two actuators 17 and 19 are designed as electrical wire rope actuators and arranged e.g. at the front side of the back rest 3, as can be seen from FIG. 1 and, in particular, FIG. 7. At the rear side of the back rest 3 an easy entry actuator button 16 is provided which puts out an operation signal to an electronic controller device which also receives measuring signals from sensor devices 26 on the seat locking mechanisms 10 and triggers the actuators 17 and 19, as will be described below.

Figure 2:
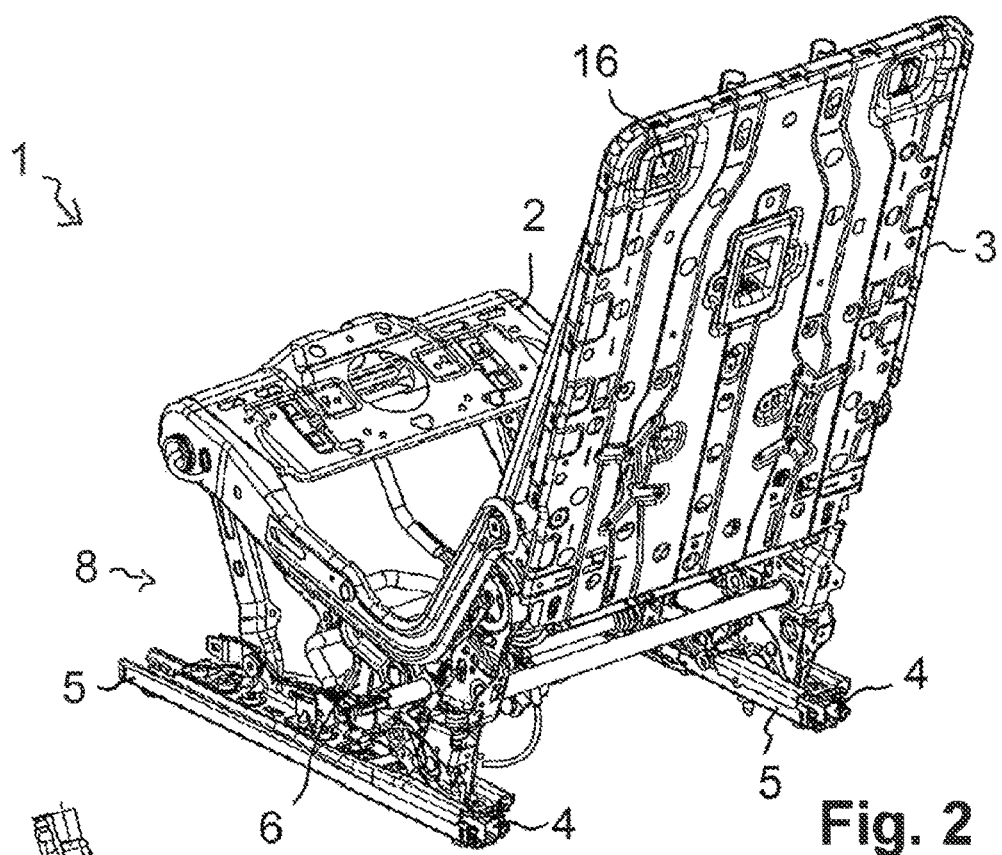
FIG. 2 is a perspective rear view of the vehicle seat from FIG. 1.
Figure 3:
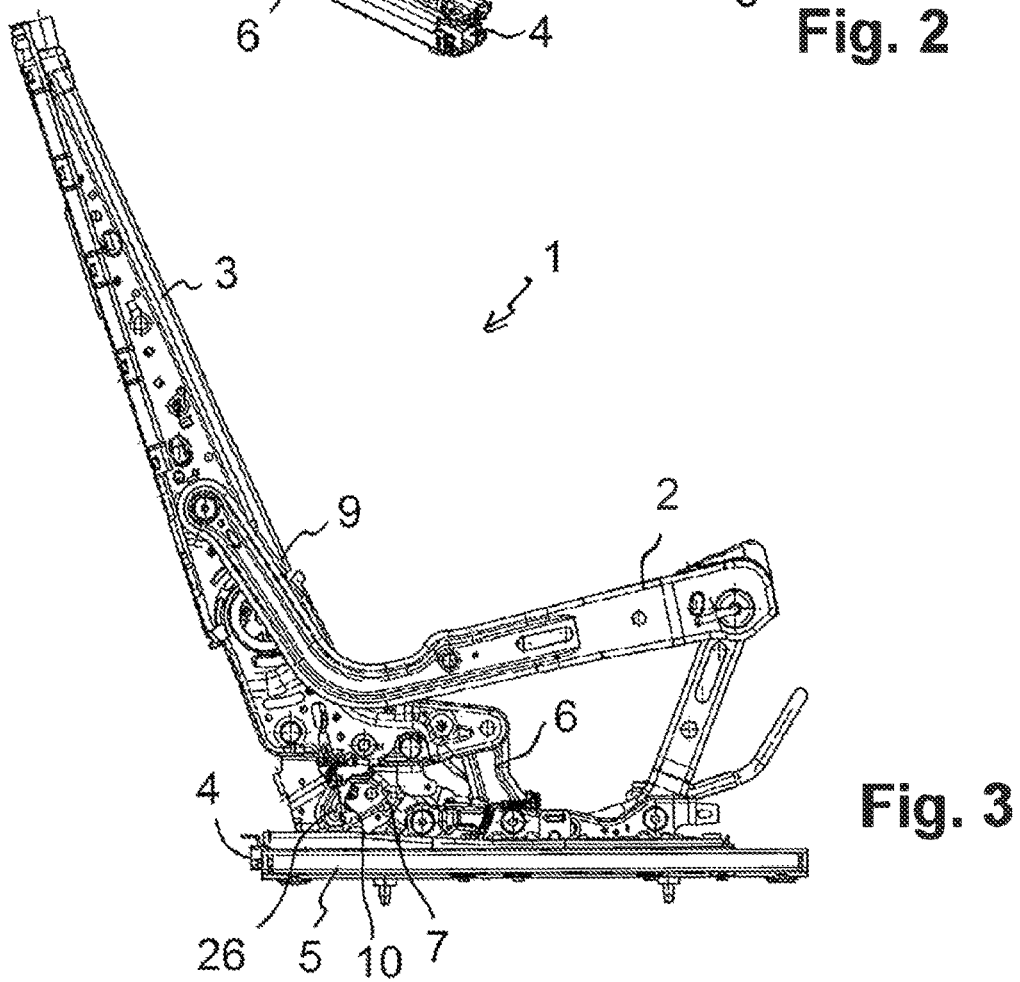
FIG. 3 is a side view of the vehicle seat from FIG. 1, 2 in the seating position.
Figure 8:
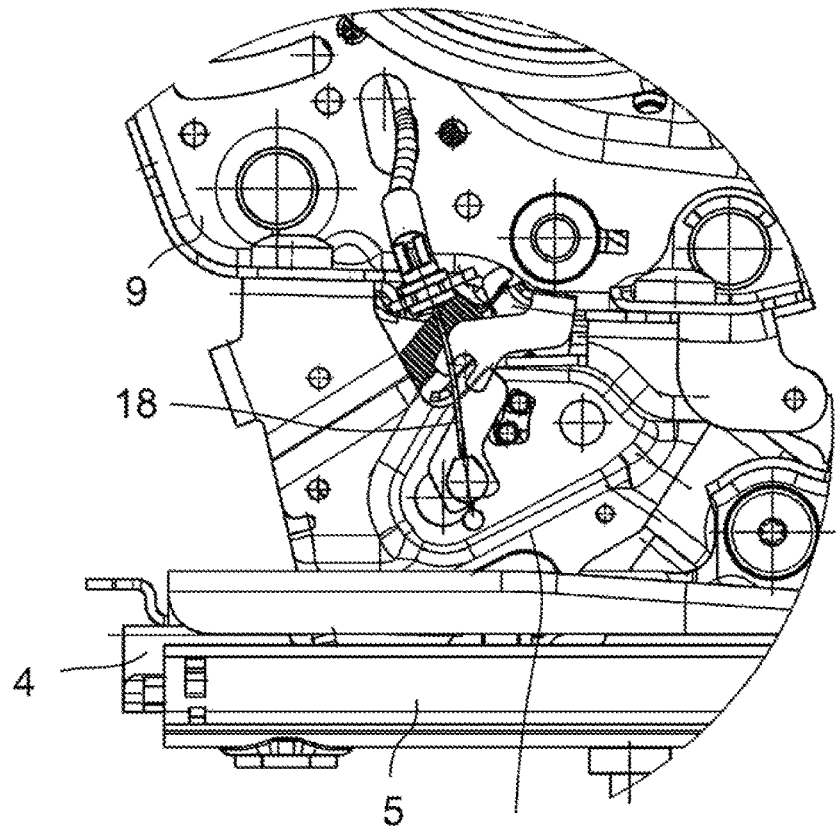
FIG. 8 is an enlarged detail view of a portion of the vehicle seat showing the seat locking mechanism in FIG. 3.

To make an adjustment starting from the seating position of FIGS. 1 through 3 the user operates the easy entry actuator button 16 once, whereupon the controller device detects from the measuring signals of the sensor devices 26 that the seat locking mechanism 10 is locked so that the controller device triggers the first actuator 17 which thereupon actuates first wire rope hoists (Kabel) 18 shown in FIG. 8 by means of which the seat locking mechanism 10 is unlocked. Thereafter, the user—employing the same hand movement, i.e. by pressing the easy entry actuator button 16 once—can tilt the back rest 3 and therewith the entire frame 9 via the easy entry four joint coupling system 8 forward into the easy entry position of FIG. 4.

The rear coupling members 7 of the easy entry four joint coupling system 8 are each joined in a pivot axis A to the upper rails 4, whereby in the pivot axis A further one cam element 20 each is pivotably provided. The cam element 20 is designed as a component separate from the rear coupling member 7 and can be carried along upon pivoting motion of the rear 7 whilst still remaining re-pivotable by means of the second actuator 19 independent of the rear coupling member 7, as will be described below.

Figure 9:
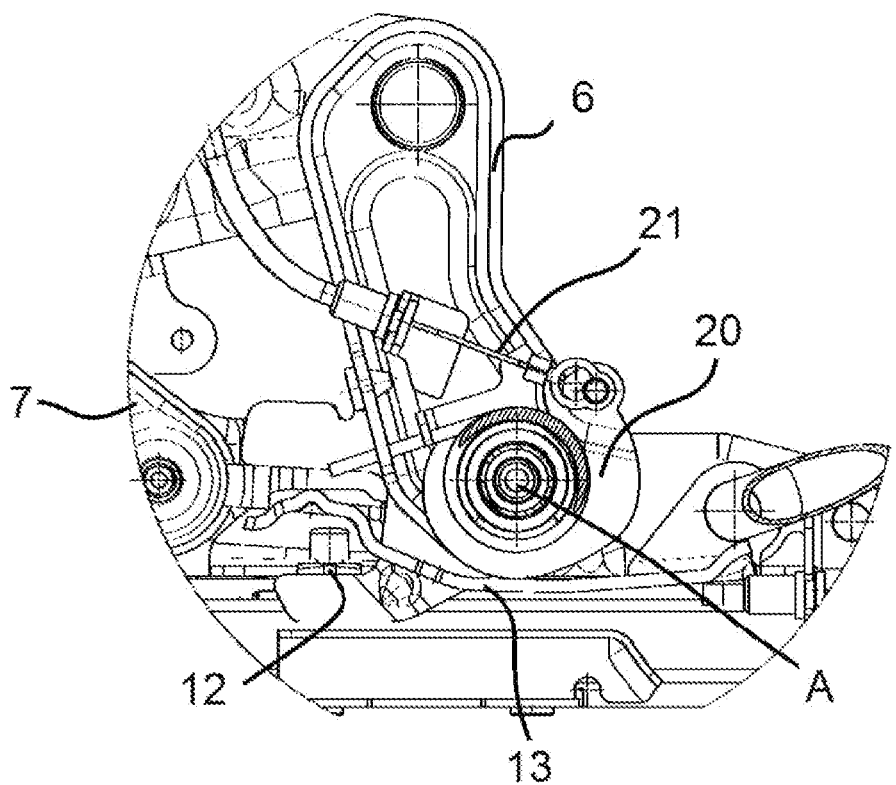
FIGS. 9-15 are enlarged detail views of portions of the vehicle seat showing the sectional interior view of the left rail unlocking arrangement in various positions and longitudinal positions.
Figure 10:
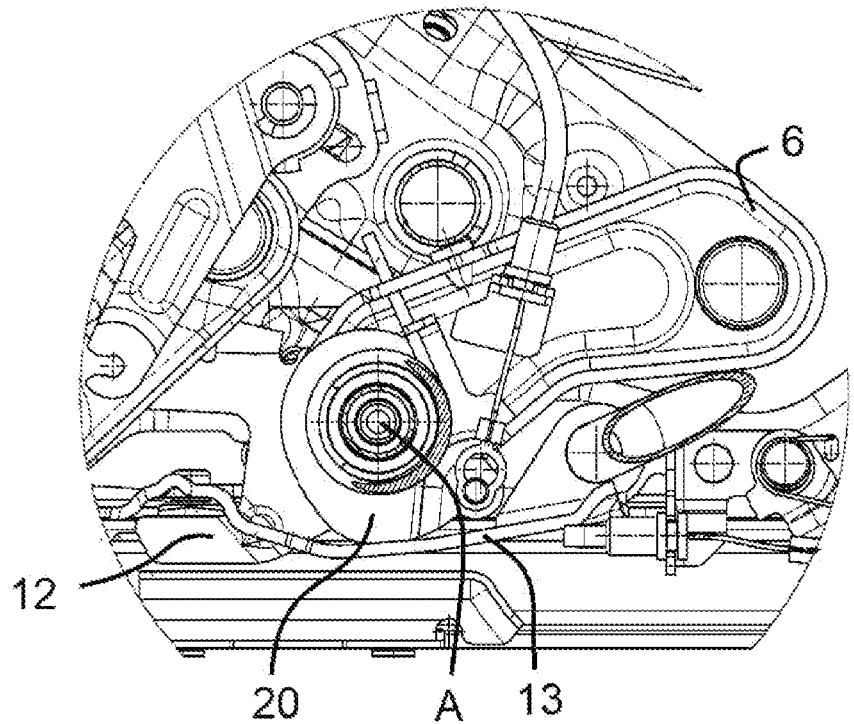
Figure 11:
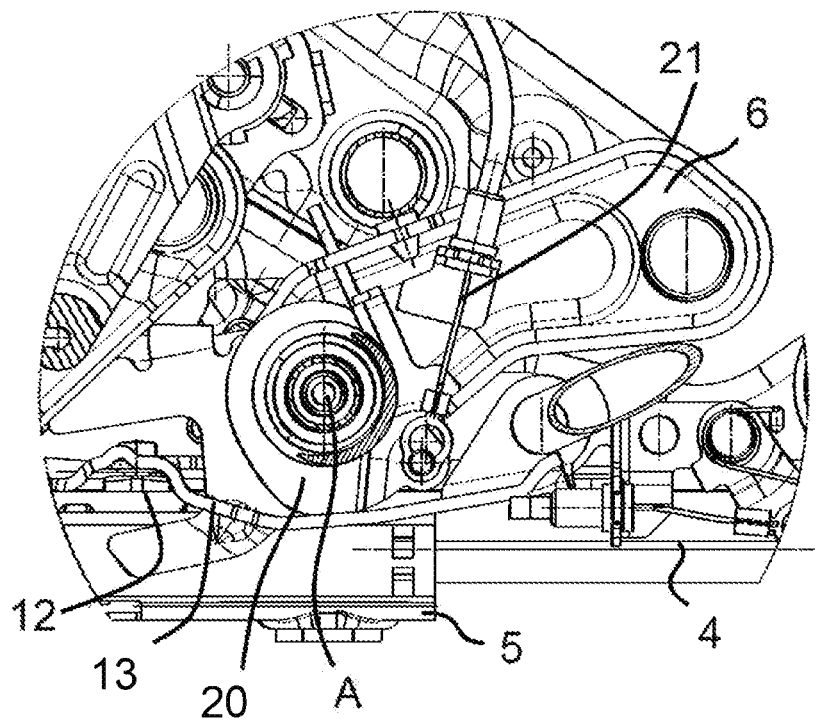
Figure 12:
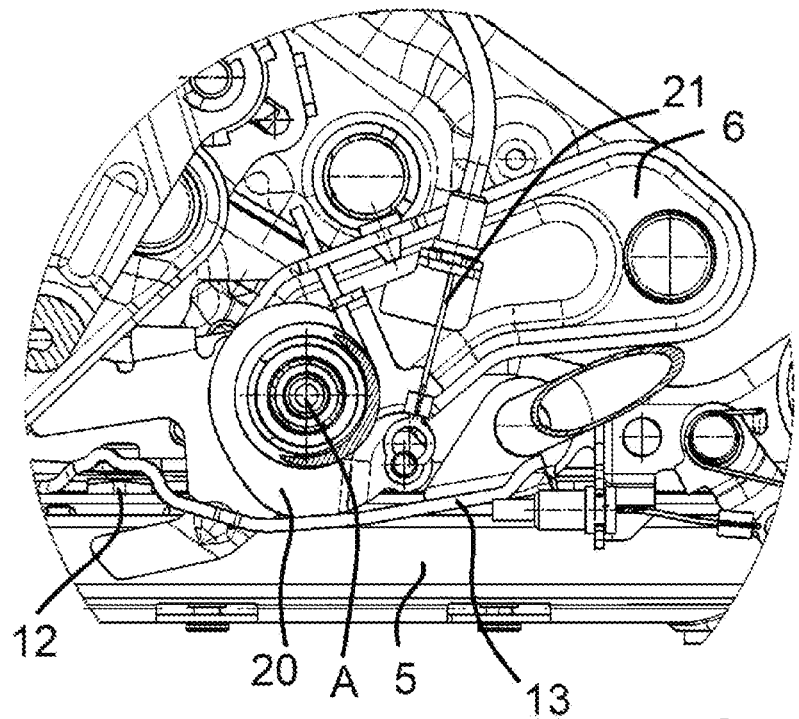
Figure 13:
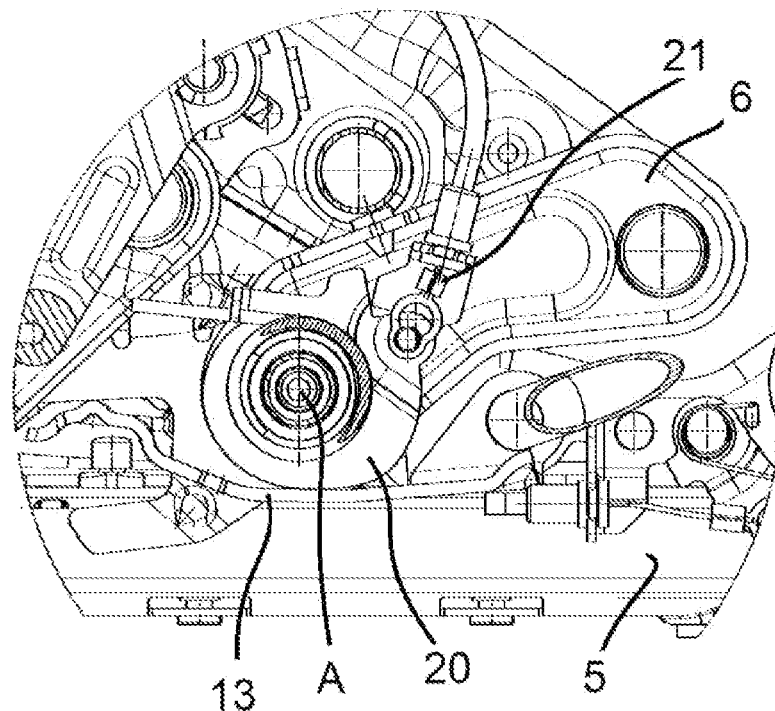
Figure 14:
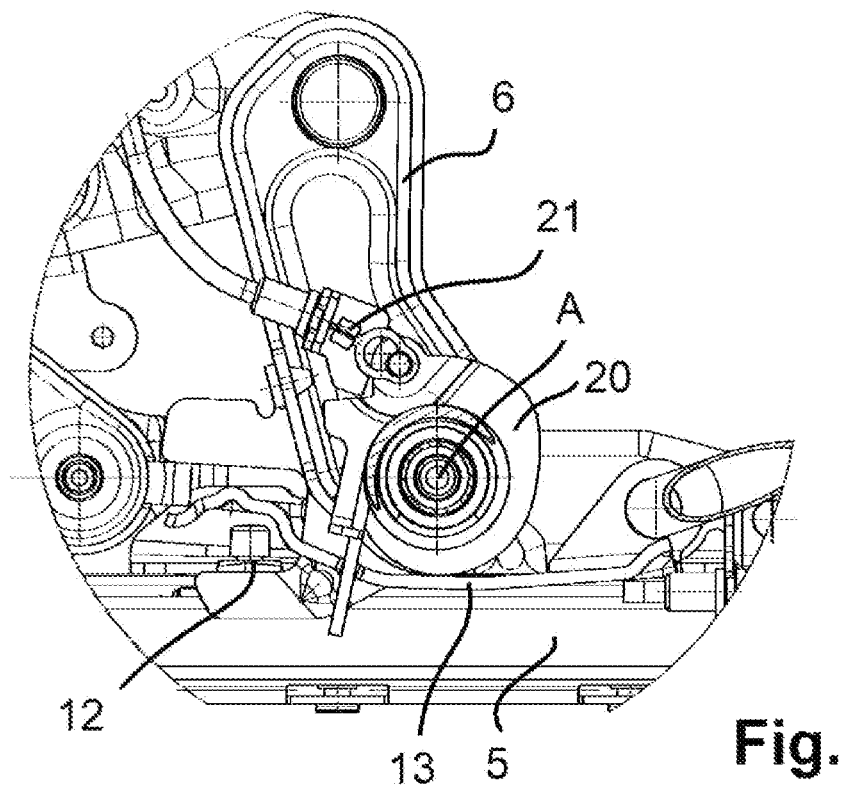
Figure 15:
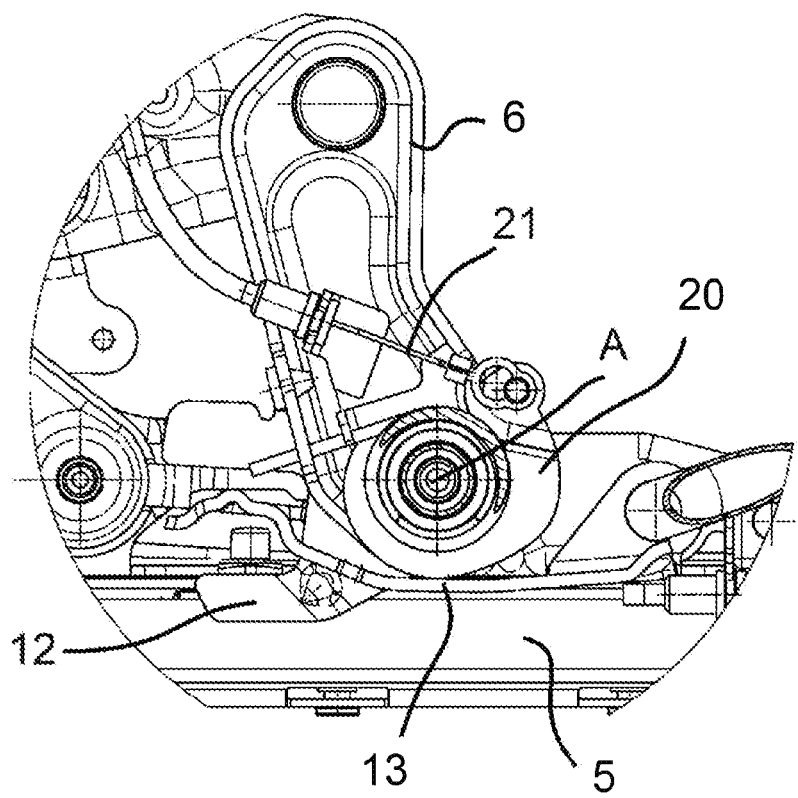

Upon the tilting motion of the frame 9, according to FIGS. 9 and 10, the rear coupling member 7 is pivoted and pivots the cam element 20 along with it, whereby the cam element 20 pushes a rail unlocking lever 13 downwards, which unlocks the longitudinal rail locking mechanism 12 so that the upper rail 4 is released in relation to the lower rail 5.

Figure 4:
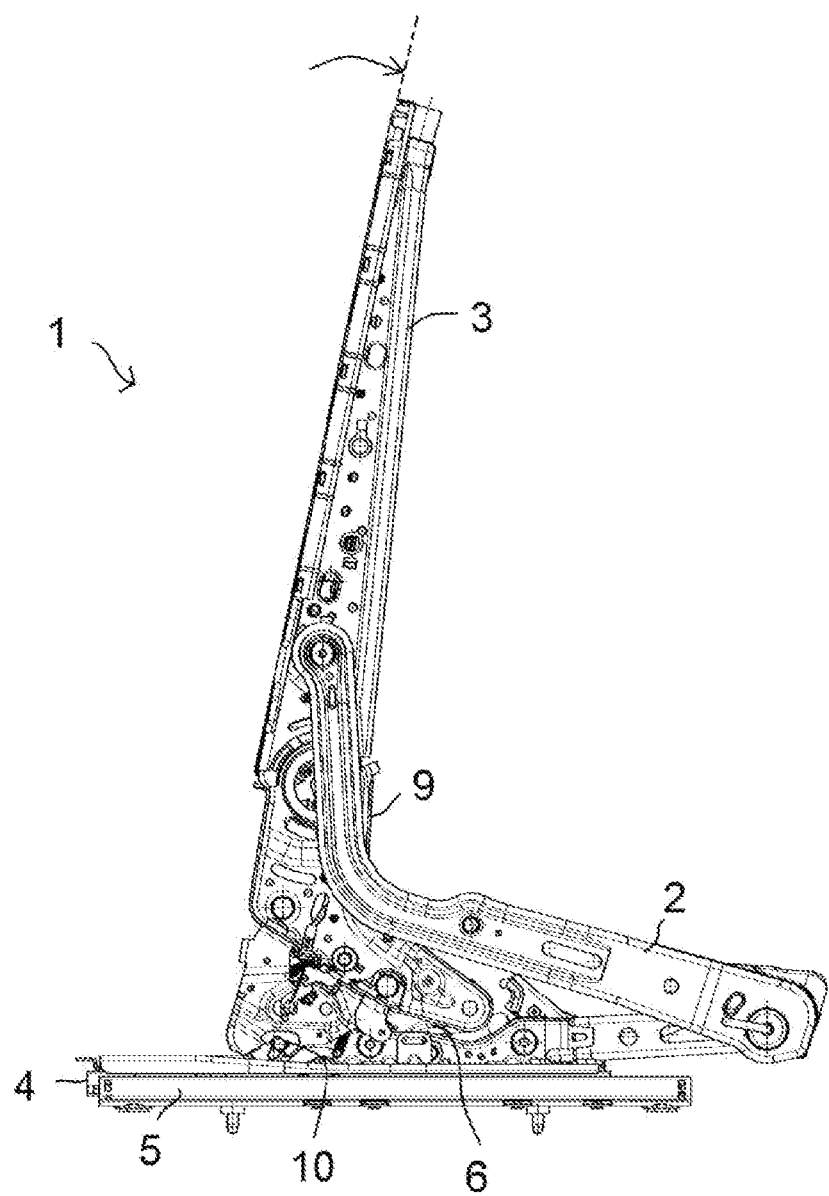
FIGS. 4-4B are side elevation views of the vehicle seat upon adjustment from the seating position to the easy entry position, as a sequence of the positions.
Figure 4A:
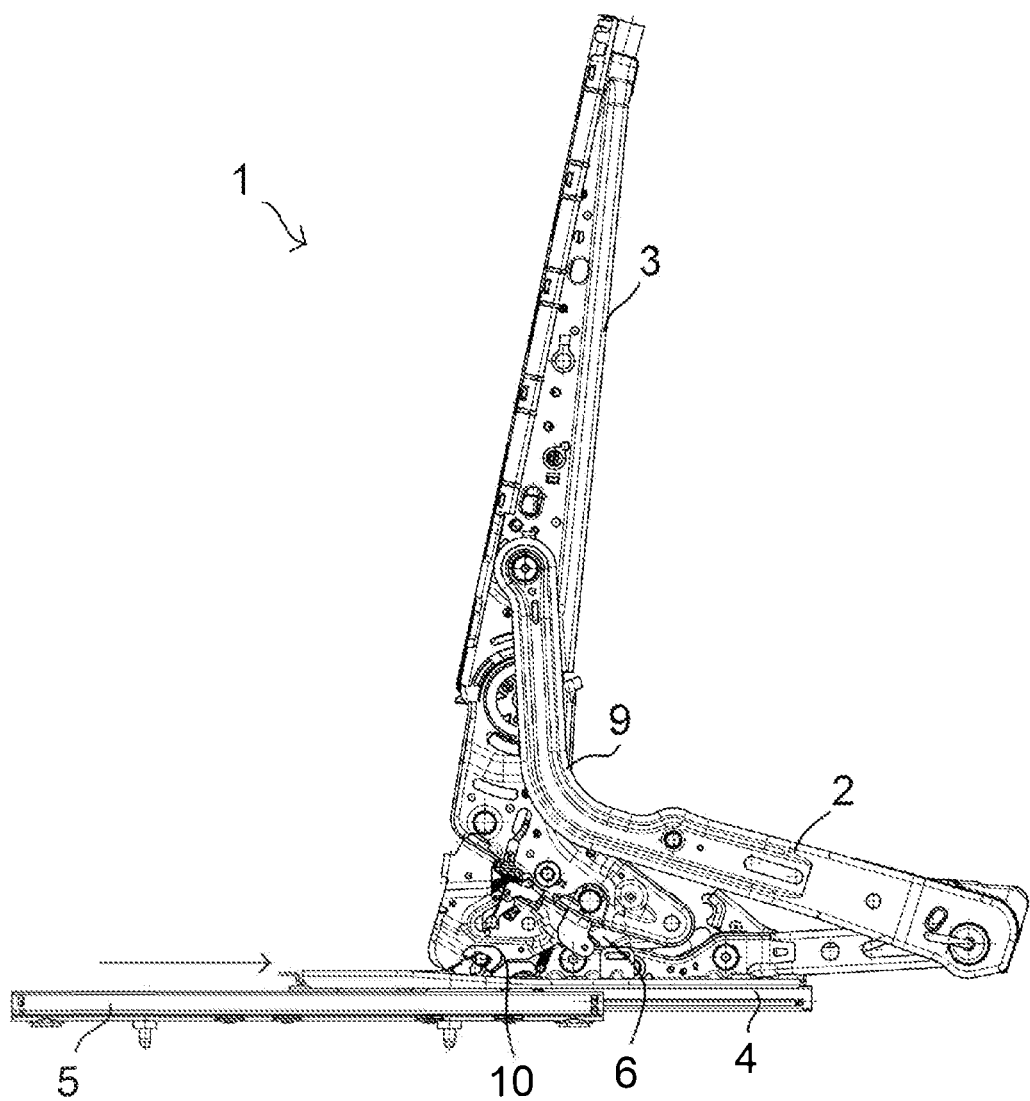
FIG. 4A is a side elevation view of the vehicle seat suggesting complete easy entry adjustment forward (by inertia)

Thus, the user, when pressing the easy entry button 16 once, is able, by virtue of the same hand movement, to tilt the back rest 3 and thereby the entire frame 9 on the easy entry four joint coupling system 8 forward, whereby the inertia of the mass of the forward tilting frame 8 supports the subsequent longitudinal adjustment including the upper rails 4 on the lower rails 5 forward into the forward easy entry position shown in FIG. 4A.

Figure 4B:
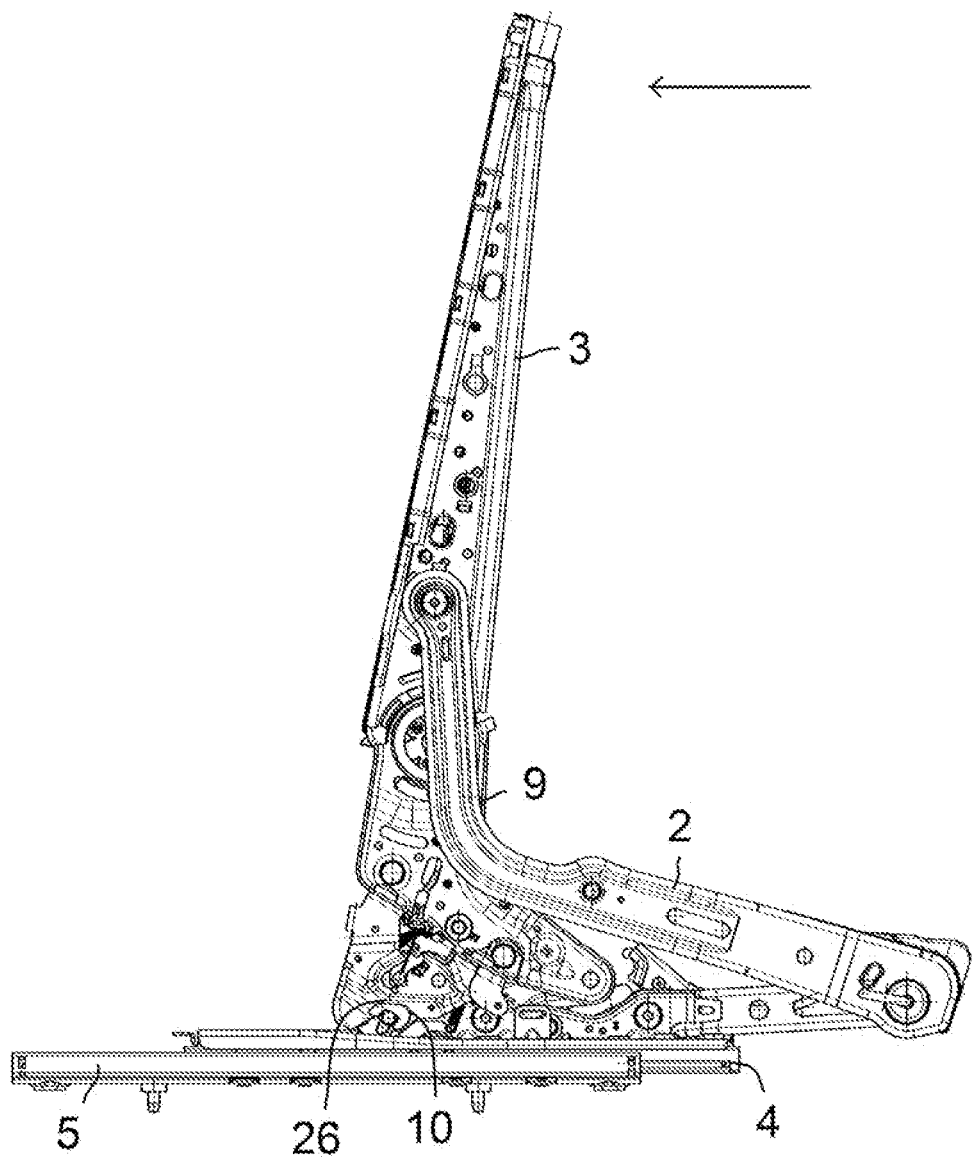
Figure 5:
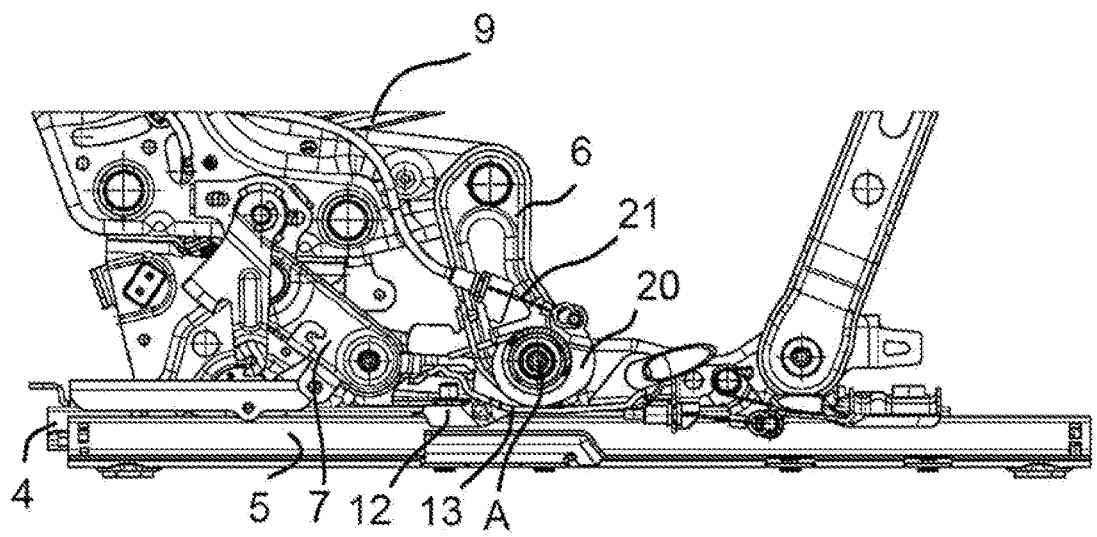
FIG. 5 is a sectional interior view of a portion of the vehicle seat showing the left rail region in the seating position of FIG. 3, with locked longitudinal rail.
Figure 6:
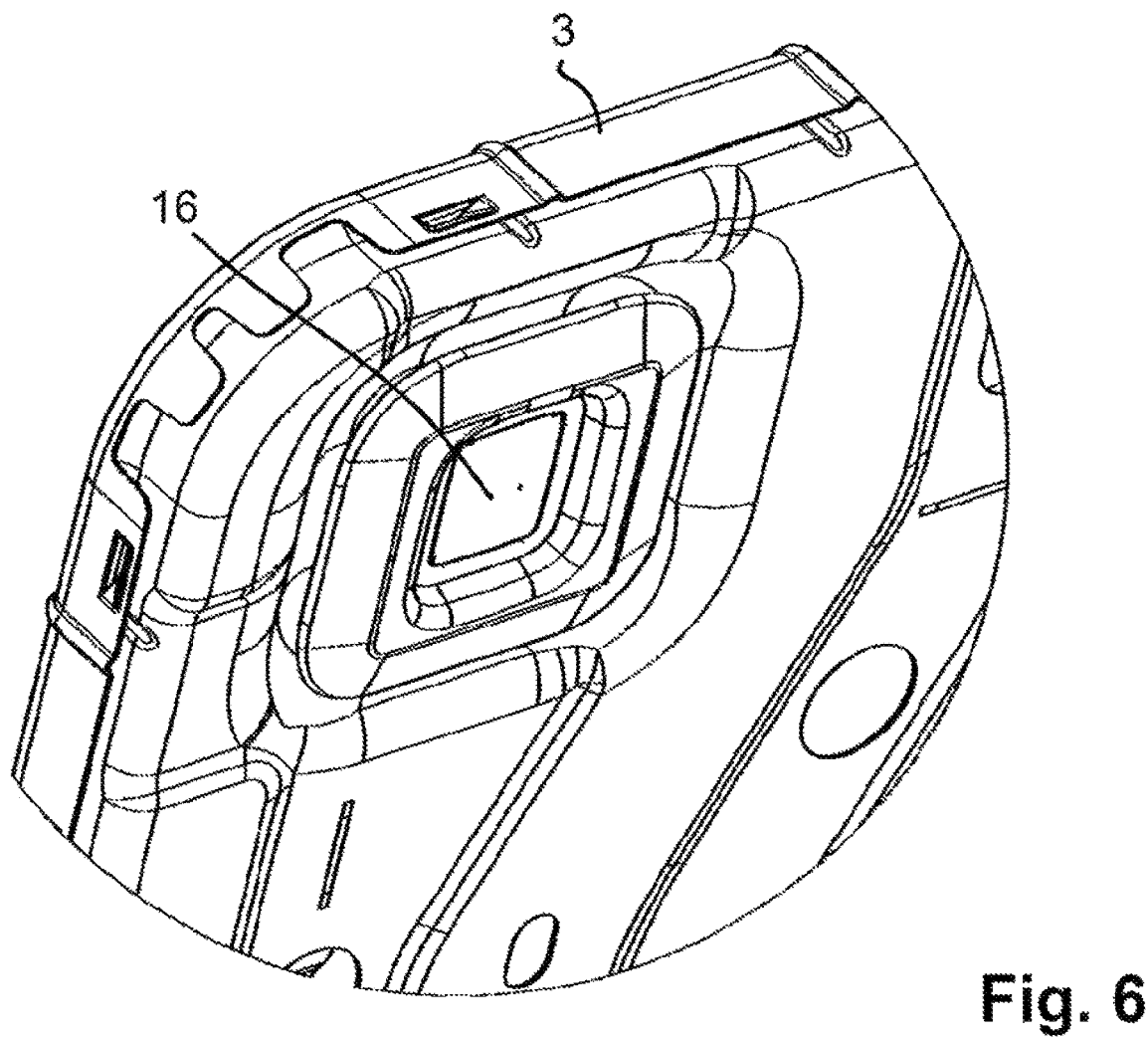
FIG. 6 is a perspective view of a portion of the vehicle seat showing the easy entry button on the back rest.

According to the present disclosure, a readjustment from the easy entry position of FIG. 4A backwards is possible not only into the starting position of FIG. 4, but also to another, preferably any, backwards longitudinal position such as e.g. FIG. 4B. For readjustment from the easy entry position of FIG. 4A the user initially again pushes the back rest 3 and therewith the seat arrangement made of the seating portion 2, the back rest 3 and the upper rails 4 backwards on the lower rails 5 in the longitudinal direction. In the longitudinal position of FIG. 4B selected by the user the user then presses the easy entry button 16.

Thereupon the controller device (ECU) 24 reads out the sensor device 26 of the seat locking mechanisms 10 and checks whether the seat locking mechanisms 10 are open or unlocked respectively. If the seat locking mechanisms 10 are open the controller device 24 triggers the second actuator 19 which actuates second wire rope hoists (Kabel) 21 thereby pivoting on each side the cam element 20 pivoting on the coupling member pivot axis A. Thus, with a fixed or, respectively, not pivoting rear coupling member 7, the cam element 20 can pivot back into its rotational position in which it takes the load off of the rail unlocking lever 13 which in turn springs back upwards due to its spring bias thereby releasing the rail locking mechanism 12 so that the upper rails 4 lock in this longitudinal position. Further, the entire frame 9, i.e. the back rest 3 with the seating portion 2, on the easy entry four joint arrangement 8 of the two coupling members 6, 7 can be tilted back into the seating position, whereby the seat locking mechanism 10 becomes locked.

In principle, the back rest 3 may pivot in relation to the seating portion 2, e.g. to allow for comfort adjustment. Thus, in particular, a further coupling system for adjusting the back rest 3 in relation to the seating portion 2 may be provided, too, having further coupling elements which are not relevant here, however.

According to an embodiment modified to that end, a storage device may be provided which, starting from the seating position, stores the respective longitudinal position. Thus, when the user subsequently readjusts the vehicle seat from the easy entry position, the previously stores the longitudinal position can be reoccupied, e.g. by means of an automatic mechanical locking in this longitudinal position. Thus, a memory function of the longitudinal position is created.

The present disclosure relates to a vehicle seat with easy entry adjustment provided, in particular, for a passenger car. The vehicle seat may be provided, in particular, in a rear or middle seat row.

Hereby, the vehicle seat comprises a seating portion with a back rest that form a frame which can pivot on upper rails via a couple system, in particular, a four joint arrangement. The upper rails are longitudinally adjustable on lower rails to be mounted on the car chassis and can be locked via a longitudinal rail locking mechanism.

In the upright seat position the seating portion or, respectively, the frame formed by the seating portion and the back rest, is locked via a seat locking mechanism. The user can unlock the seat locking mechanism by actuating an easy entry handle so that the frame formed by the seating portion with the back rest can subsequently be tilted forward via the four joint arrangement into an easy entry position. This tilting motion usually unlocks the longitudinal rail locking mechanism so that the user can subsequently longitudinally displace the vehicle seat in the forward direction so as to allow access to e.g. a rear seat row. Hereby, in principle, both manual and motorized longitudinal adjustment mechanisms are known.

For resetting the adjustment the user can grab the back rest and so push the vehicle seat or, respectively, the frame with four joint arrangement and upper rails in the backwards direction back into the longitudinal position and tilt the frame formed by the seating portion with the back rest back into the seating position in which the seat locking mechanism is locked.

Hereby, in general, when resetting the adjustment, the longitudinal position of the seating position is already predetermined by the starting position. However, the respective longitudinal position may possibly be obstructed e.g. by luggage behind the seat row so that this re-adjustment may be problematic.

The present disclosure is based on the object of creating a vehicle seat with easy entry adjustment allowing for a high flexibility in readjustment.

Thus, according to the present disclosure, a readjustment from the easy entry position, which is tilted forward and pushed forward longitudinally, in different longitudinal positions is made possible. In particular, a readjustment may be provided in every backwards longitudinal position.

Hereby, several advantages ensue. Thus, the user can adjust the vehicle seat upon readjustment to a suitable longitudinal position in which the vehicle seat is not obstructed by e.g. objects in the rear even during subsequent backwards tilting. Thus, the user can select this longitudinal position directly upon readjustment.

In particular, both the adjustment of the seating position to the easy entry position and the readjustment may be carried out using one hand only so that the operation is quick and easy.

Thus, according to the present disclosure, the construction may be achieved using only a few additional elements. Thus, the high functionality may be achieved already by attaching a separate cam element to a coupling member of the easy entry four joint arrangement. The cam element serves to unlock the rail and may be provided, in particular, pivoting in a lower coupling member pivot axis of the coupling member, whereby the cam element upon forward tilting is taken along (tappeted) by the pivoting coupling member thereby enabling the longitudinal unlocking. Thus, an automatic longitudinal unlocking may happen upon forward tilting the frame.

Thus, upon actuating the easy entry handle, e.g. an easy entry button provided on the back side of the back rest, the user can tilt the back rest with the seating portion on the easy entry four joint arrangement forward and thereby unlock the longitudinal seat lock. By virtue of the mechanical inertia of the forward tilting construction alone it is usually possible to initiate the longitudinal adjustment so as to enable a continuous fluent actuation to achieve the forward adjusted easy entry position.

In readjusting, the user is essentially free to choose a desired longitudinal position. Thus, he will pull the vehicle seat backwards, in particular by grabbing the back rest, and can operate the easy entry handle in the longitudinal position deemed suitable.

This, alone, results in the advantage that one and the same easy entry actuator is provided for both adjustments, i.e. in both directions, i.e. a simple operation without confusing the user. In that the user upon readjustment operates the easy entry handle in the desired longitudinal position, preferably, the cam element may be tilted back for locking without pivoting the easy entry four joint arrangement. Thus, the longitudinal locking of the upper rails in relation to the lower rails can be released and thus lock in the current longitudinal position. In this locked longitudinal position the user may subsequently tilt the vehicle seat back to the upright seating position, whereby the seat locking mechanism again automatically locks in the back tilting motion.

Hereby, advantageously, a controller device, in particular an electronic controller device, is provided which detects the actuation signal upon operation of the easy entry handle and further reads out the locking state of the seat locking mechanism. Thus, the controller device can detect whether the operation of the easy entry handle either starting from the seating position serves for unlocking and adjusting to the easy entry position or for readjustment from the easy entry position to the seating position: When unlocking starting from the seating position the seat locking mechanism is still locked while in readjustment it is unlocked.

When operating the easy entry starting from the seating position the controller device may trigger, in particular, a first actuator for unlocking the seat locking mechanism; When operating the easy entry in readjustment, i.e. with the frame being tilted forward, the controller device may trigger, in particular, a second actuator which pivots the cam element thereby enabling locking of the rail. Thus, the high functionality according to the present disclosure can be attained by little additional expenditure, in particular, a cam element that can be carried along.

According to an embodiment deviating here from, a storage device may be provided which stores, starting from the seating position, the respective current longitudinal position. Thus, when the user subsequently readjusts the vehicle seat starting from the easy entry position, the pre-stored longitudinal position can be occupied again, e.g. by means of an automatic mechanical locking in this longitudinal position. Thus, a memory function of the longitudinal position is attained.

According to the present disclosure, the frame may be adjusted in one pieces or rigidly respectively in the forward tilting motion into the easy entry position; further, the back rest may be adjusted in relation to the seating portion in the forward tilting motion.

The present disclosure relates to a vehicle seat with a frame (9) formed by a seating portion and a back rest (3), upper rails (4) longitudinally adjustable on lower rails (5) and lockable by means of a longitudinal rail locking mechanism (12), a coupling system (8) for adjustment of the frame (9) in relation to the upper rails (4), said coupling system (8) comprising a coupling member (7) with a coupling member pivot axis (A), a seat locking mechanism for locking the vehicle seat (1) in an upright seating position, where said frame (9), upon operation of an easy entry actuator and unlocking of the seat locking mechanism, can be tilted forward starting from the upright seating position.

Hereby, a cam element (20) pivoting in the coupling member pivot axis (A) is provided, which can be carried along by the coupling member (7) upon forward tilting of the frame (9) to unlock the longitudinal rail locking mechanism (12) and subsequent longitudinal adjustment to the easy entry position, where the cam element (20) can further be pivoted back upon readjustment in several backwards longitudinal positions of the upper rails (4) by operating the easy entry actuator independent of the coupling member (7) to release the longitudinal rail locking mechanism (12).

Thus, a readjustment can be made to several, in particular, all backwards longitudinal positions.

Preferably, a sensor device is provided to detect the locking state of the rail locking mechanism so that operation of the easy entry actuator is possible for both adjustments.

The following numbered clauses include embodiments that are contemplated and non-limiting:

Clause 1. A vehicle seat (1) having an easy entry adjustment mechanism, comprising:

a seating portion (2) and a back rest (3) which together form a frame (9), lower rails (5) to be mounted on the vehicle chassis and upper rails (4) longitudinally adjustable on said lower rails (5), an easy entry coupling system (8) for articulated adjustment of the frame (9) in relation to the upper rails (4), said easy entry coupling system (8) having at least one coupling member (7) with a coupling member pivot axis (A), a seat locking mechanism (10) for locking the vehicle seat (1) in an upright seating position, said seat locking mechanism (10) being capable of being unlocked by operating an easy entry actuator (16) and subsequently the frame (9) of being tilted forward starting from the upright seating position, a longitudinal rail locking mechanism (12) provided between the upper rails (4) and the lower rails (5) and a rail unlocking device (13, 20) for unlocking the longitudinal rail locking mechanism (12), said rail unlocking device (13, 20) being capable of being actuated by forward tilting of the frame (9), for subsequent longitudinal adjustment to an easy entry position, characterized in that said rail unlocking device (13, 20) having a cam element (20) pivoting in the coupling member pivot axis (A) which can be pivoted by forward tilting of the frame (9) for unlocking the longitudinal rail locking mechanism (12) and pivoted back by means of an actuator (19) for locking the longitudinal rail locking mechanism (12), whereby the vehicle seat (1) can be readjusted from the easy entry position back to the seating position in various longitudinal positions of the upper rails (4) while locking the longitudinal rail locking mechanism (12) and the seat locking mechanism (10).

Clause 2. The vehicle seat (1) according to clause 1, characterized in that the cam element (20) is designed as a component separate from the coupling member (7) and can be carried along by the coupling member (7) upon forward tilting starting from the seating position, for actuating a rail unlocking means (13).

Clause 3. The vehicle seat (1) according to clause 1 or 2, characterized in that it comprises:

a first actuator (17) which can be activated, starting from the seating position, upon operation of the easy entry actuator (16) for unlocking the seat locking mechanism (10), and a second actuator (19) for re-pivoting the cam element (20) for locking the longitudinal rail locking mechanism (12) in one of several longitudinal positions of the upper rail (4), upon readjustment.

Clause 4. The vehicle seat (1) according to clause 3, characterized in that it comprises: an electronic controller device (24) and a sensor device (26) provided on the seat locking mechanism (10) which detects the locking state of the seat locking mechanism (10) and can be read out by the controller device (24), said controller device (24) being adapted, upon operation of the easy entry actuator (16), to read out the sensor device (26) and to trigger the first actuator (17) or the second actuator (19) depending on the locking state.

Clause 5. The vehicle seat (1) according to clause 4, characterized in that the controller device (24), upon operation of the easy entry actuator (16), when the seat locking mechanism (10) is locked, triggers the first actuator (17) to unlock the seat locking mechanism (10) and, when the seat locking mechanism (10) is unlocked, triggers the second actuator (19) to pivot the cam element (20).

Clause 6. The vehicle seat (1) according to one of the clauses 3 through 5, characterized in that the first actuator (17) actuates one first wire rope hoist (18) to unlock the seat locking mechanism (10) at each side of the vehicle seat (1), and/or the second actuator (19) actuates second wire rope hoists (21) to pivot the cam elements (20) at each side of the vehicle seat (1), in particular, against a spring bias.

Clause 7. The vehicle seat (1) according to one of the clauses 3 through 6, characterized in that the vehicle seat (1) can be readjusted from the easy entry position back to the seating position by: longitudinal readjustment of the frame (9) with upper rails (4) on the lower rails (5) to a selected backwards longitudinal position, operating the easy entry actuator (16), receiving an actuation signal from the easy entry actuator (16) by the controller device (24)

reading out the sensor device (26) by the controller device (24) and checking the locking state of the seat locking mechanism (10), and, in the event that the seat locking mechanism (10) is unlocked, operating a second actuator (19) by the controller device (24) to pivot the cam device (20) to lock the longitudinal rail locking mechanism (12) in the current longitudinal position and tilting the frame (9) backwards to attain the seating position and automatic locking of the seat locking mechanism (10).

Clause 8. The vehicle seat (1) according to one of the above clauses, characterized in that the frame (9) can be longitudinally adjusted with upper rails (4) on the lower rails (5) forwards and/or backwards by the user manually, without motorized support.

Clause 9. The vehicle seat (1) according to one of the above clauses, characterized in that the vehicle seat (1), upon readjustment from the easy entry position, can be readjusted to the seating position in any backwards longitudinal position of the upper rails (4), always while locking the longitudinal rail locking mechanism (12).

Clause 10. The vehicle seat (1) according to one of the above clauses, characterized in that the forward tilted seating portion (2) with the back rest (3), after unlocking of the longitudinal rail locking mechanism (12), can be longitudinally adjusted forward with the upper rails (4) on the lower rails (5) due to the inertia of the forward tilting motion of the frame consisting of the seating portion (2) and the back rest (3).

Clause 11. The vehicle seat (1) according to one of the above clauses, characterized in that no longitudinal position storage device is provided for storing the longitudinal starting position in the seating position.

Clause 12. The vehicle seat (1) according to one of the clauses 1 through 10, characterized in that a longitudinal position storage device, in particular mechanical longitudinal position storage device, is provided for storing the longitudinal position of the vehicle seat (1) in the seating position, whereby, upon longitudinal adjustment of the seating portion (2) with the back rest (3) backwards from the easy entry position, the upper rails (4) can be stopped and/or locked in the stored longitudinal position.

The invention claimed is:
1. A vehicle seat having an easy entry adjustment mechanism, the vehicle seat comprising a seating portion and a back rest which together form a frame, lower rails and upper rails longitudinally adjustable on said lower rails, an easy entry coupling system for articulated adjustment of the frame in relation to the upper rails, said easy entry coupling system having at least one coupling member with a coupling member pivot axis, a seat locking mechanism for locking the vehicle seat in an upright seating position, said seat locking mechanism being capable of being unlocked by operating an easy entry actuator so that the frame may be tilted forward from the upright seating position, a longitudinal rail locking mechanism provided between the upper rails and the lower rails and a rail unlocking device for unlocking the longitudinal rail locking mechanism, said rail unlocking device being capable of being actuated by forward tilting of the frame, for subsequent longitudinal adjustment to an easy entry position, wherein said rail unlocking device having a cam element pivoting on the coupling member pivot axis and which can be pivoted by forward tilting of the frame for unlocking the longitudinal rail locking mechanism and pivoted back by an actuator for locking the longitudinal rail locking mechanism, whereby the vehicle seat can be readjusted from the easy entry position back to the seating position in various longitudinal positions of the upper rails while locking the longitudinal rail locking mechanism and the seat locking mechanism.

2. The vehicle seat of claim 1, wherein the cam element is designed as a component separate from the coupling member and can be carried along by the coupling member upon forward tilting starting from the seating position, for actuating the rail unlocking means.

3. The vehicle seat of claim 1, further comprising a first actuator which can be activated, starting from the seating position, upon operation of the easy entry actuator for unlocking the seat locking mechanism, and wherein the actuator is a second actuator for re-pivoting the cam element for locking the longitudinal rail locking mechanism in one of several longitudinal positions of the upper rail, upon readjustment.

4. The vehicle seat of claim 3, further comprising an electronic controller device and a sensor device provided on the seat locking mechanism which detects the locking state of the seat locking mechanism and can be read out by the controller device, said controller device being adapted, upon operation of the easy entry actuator, to read out the sensor device and to trigger the first actuator or the second actuator depending on the locking state.

5. The vehicle seat of claim 4, wherein the controller device, upon operation of the easy entry actuator, when the seat locking mechanism is locked, triggers the first actuator to unlock the seat locking mechanism and, when the seat locking mechanism is unlocked, triggers the second actuator to pivot the cam element.

6. The vehicle seat of claim 4, wherein the vehicle seat can be readjusted from the easy entry position back to the seating position by:

longitudinal readjustment of the frame with upper rails on the lower rails to a selected backwards longitudinal position, operating the easy entry actuator, receiving an actuation signal from the easy entry actuator by the controller device, reading out the sensor device by the controller device, and checking the locking state of the seat locking mechanism, and, in the event that the seat locking mechanism is unlocked, operating a second actuator by the controller device to pivot the cam device to lock the longitudinal rail locking mechanism in a current longitudinal position, and tilting the frame backwards to attain the seating position and automatic locking of the seat locking mechanism.

7. The vehicle seat of claim 3, wherein the first actuator actuates a first wire rope hoist to unlock the seat locking mechanism, and/or the second actuator actuates a second wire rope hoist to pivot the cam element, in particular, against a spring bias.

8. The vehicle seat of claim 1, wherein the frame can be longitudinally adjusted with upper rails on the lower rails forwards and/or backwards by a user manually, without motorized support.

9. The vehicle seat of claim 1, wherein the vehicle seat, upon readjustment from the easy entry position, can be readjusted to the seating position in any backwards longitudinal position of the upper rails, always while locking the longitudinal rail locking mechanism.

10. The vehicle seat of claim 1, wherein the forward tilted seating portion with the back rest, after unlocking of the longitudinal rail locking mechanism, can be longitudinally adjusted forward with the upper rails on the lower rails due to inertia of the forward tilting motion of the frame consisting of the seating portion and the back rest.

11. The vehicle seat of claim 1, wherein no longitudinal position storage device is provided for storing a longitudinal starting position in the seating position.

12. The vehicle seat of claim 1, wherein a longitudinal position storage device, in particular mechanical longitudinal position storage device, is provided for storing the longitudinal position of the vehicle seat in the seating position, whereby, upon longitudinal adjustment of the seating portion with the back rest backwards from the easy entry position, the upper rails can be stopped and/or locked in a stored longitudinal position.

* * * * *